United States Patent
Lee et al.

(10) Patent No.: US 8,396,020 B2
(45) Date of Patent: Mar. 12, 2013

(54) POINT-TO-MULTIPOINT SERVICE COMMUNICATION

(75) Inventors: Young-Dae Lee, Gyeonggi-Do (KR); Sung-Duck Chun, Gyeonggi-Do (KR); Myung-Cheul Jung, Seoul (KR); Sung-Jun Park, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 786 days.

(21) Appl. No.: 12/160,092

(22) PCT Filed: Jan. 4, 2007

(86) PCT No.: PCT/KR2007/000066
§ 371 (c)(1), (2), (4) Date: Jul. 3, 2008

(87) PCT Pub. No.: WO2007/078164
PCT Pub. Date: Jul. 12, 2007

(65) Prior Publication Data
US 2009/0016254 A1    Jan. 15, 2009

Related U.S. Application Data

(60) Provisional application No. 60/797,402, filed on May 2, 2006, provisional application No. 60/784,976, filed on Mar. 22, 2006, provisional application No. 60/784,680, filed on Mar. 21, 2006, provisional application No. 60/757,063, filed on Jan. 5, 2006.

(30) Foreign Application Priority Data

Jan. 3, 2007   (KR) .................... 10-2007-0000767

(51) Int. Cl.
*H04H 20/71*   (2008.01)
*H04J 3/26*   (2006.01)

(52) U.S. Cl. ........................................ 370/312; 370/432
(58) Field of Classification Search .................. None
See application file for complete search history.

(56) References Cited

U.S. PATENT DOCUMENTS

| | | |
|---|---|---|
| 6,138,158 A | 10/2000 | Boyle et al. |
| 6,317,430 B1 | 11/2001 | Knisely et al. |
| 6,381,229 B1 | 4/2002 | Narvinger et al. |
| 6,421,540 B1 | 7/2002 | Gilhousen et al. |
| 6,480,525 B1 | 11/2002 | Parsa et al. |
| 6,571,102 B1 | 5/2003 | Hogberg et al. |
| 6,597,668 B1 | 7/2003 | Schafer et al. |
| 6,694,148 B1 | 2/2004 | Frodigh et al. |

(Continued)

FOREIGN PATENT DOCUMENTS

| | | |
|---|---|---|
| CN | 1411668 | 4/2003 |
| CN | 1663158 | 8/2005 |

(Continued)

OTHER PUBLICATIONS

Ericsson, "E-UTRA Random Access," TSG-RAN WG1 #43, R1-051445, Nov. 2005.

(Continued)

*Primary Examiner* — Chirag Shah
*Assistant Examiner* — Srinivasa Reddivalam
(74) *Attorney, Agent, or Firm* — Lee, Hong, Degerman, Kang, Waimey

(57) ABSTRACT

Among a plurality of point-to-multipoint control channels provided by a cell, a particular point-to-multipoint control channel is selected according to a preferred way of receiving the point-to-multipoint service. Control information related to the point-to-multipoint service is received through the selected point-to-multipoint control channel, and then the point-to-multipoint service is received according to the control information.

4 Claims, 3 Drawing Sheets

U.S. PATENT DOCUMENTS

| | | |
|---|---|---|
| 6,717,925 B1 | 4/2004 | Leppisaari et al. |
| 6,728,225 B1 | 4/2004 | Ozluturk |
| 6,795,412 B1 | 9/2004 | Lee |
| 6,859,445 B1 | 2/2005 | Moon et al. |
| 6,882,727 B1 | 4/2005 | Vialen et al. |
| 6,907,005 B1 | 6/2005 | Dahlman et al. |
| 6,907,015 B1 | 6/2005 | Moulsley et al. |
| 6,947,394 B1 | 9/2005 | Johansson et al. |
| 6,950,420 B2 | 9/2005 | Sarkkinen et al. |
| 6,965,580 B1 | 11/2005 | Takagi et al. |
| 7,031,708 B2 | 4/2006 | Sarkkinen et al. |
| 7,075,971 B2 | 7/2006 | Parsa et al. |
| 7,145,895 B2 | 12/2006 | Mueckenheim et al. |
| 7,151,758 B2 | 12/2006 | Kumaki et al. |
| RE39,454 E | 1/2007 | Cantoni et al. |
| 7,184,792 B2 | 2/2007 | Mir |
| 7,236,787 B1 | 6/2007 | Tamura et al. |
| 7,359,345 B2 | 4/2008 | Chang et al. |
| 7,359,349 B2 | 4/2008 | Kayama et al. |
| 7,430,206 B2 | 9/2008 | Terry et al. |
| 7,436,801 B1 | 10/2008 | Kanterakis |
| 7,443,816 B2 | 10/2008 | Chen et al. |
| 7,496,113 B2 | 2/2009 | Cai et al. |
| 7,535,886 B2 | 5/2009 | Lee et al. |
| 7,664,059 B2 | 2/2010 | Jiang |
| 7,673,211 B2 | 3/2010 | Meyer et al. |
| 7,729,719 B2 | 6/2010 | Bergstrom et al. |
| 7,778,599 B2 | 8/2010 | Li et al. |
| 7,826,855 B2 | 11/2010 | Chun et al. |
| 7,826,859 B2 | 11/2010 | Lee et al. |
| 7,881,724 B2 | 2/2011 | Park et al. |
| 8,090,382 B2 | 1/2012 | Park et al. |
| 2001/0024956 A1 | 9/2001 | You |
| 2001/0046864 A1 | 11/2001 | Bhatoolaul et al. |
| 2002/0009129 A1 | 1/2002 | Choi et al. |
| 2002/0021714 A1 | 2/2002 | Seguin |
| 2002/0028690 A1 | 3/2002 | McKenna et al. |
| 2002/0032884 A1 | 3/2002 | Kobata et al. |
| 2002/0044527 A1 | 4/2002 | Jiang |
| 2002/0071480 A1 | 6/2002 | Marjelund et al. |
| 2002/0090004 A1 | 7/2002 | Rinchiuso |
| 2002/0093940 A1 | 7/2002 | Toskala |
| 2002/0131375 A1 | 9/2002 | Vogel et al. |
| 2002/0160744 A1 | 10/2002 | Choi et al. |
| 2002/0181436 A1 | 12/2002 | Mueckenheim |
| 2002/0187789 A1 | 12/2002 | Diachina |
| 2002/0191559 A1 | 12/2002 | Chen et al. |
| 2003/0003920 A1 | 1/2003 | Sebastian |
| 2003/0007510 A1 | 1/2003 | Yeo et al. |
| 2003/0016672 A1 | 1/2003 | Rosen et al. |
| 2003/0043741 A1 | 3/2003 | Mukai et al. |
| 2003/0050097 A1 | 3/2003 | Amirijoo et al. |
| 2003/0054829 A1 | 3/2003 | Moisio |
| 2003/0076812 A1 | 4/2003 | Benedittis |
| 2003/0078046 A1 | 4/2003 | Seo |
| 2003/0084185 A1 | 5/2003 | Pinkerton |
| 2003/0087655 A1 | 5/2003 | Matsuoka |
| 2003/0103476 A1 | 6/2003 | Choi et al. |
| 2003/0139170 A1 | 7/2003 | Heo |
| 2003/0147371 A1 | 8/2003 | Choi |
| 2003/0210669 A1 | 11/2003 | Vayanos et al. |
| 2003/0223393 A1 | 12/2003 | Lee |
| 2003/0236085 A1 | 12/2003 | Ho |
| 2004/0002334 A1 | 1/2004 | Lee et al. |
| 2004/0004954 A1 | 1/2004 | Terry et al. |
| 2004/0006643 A1 | 1/2004 | Dolson et al. |
| 2004/0008658 A1 | 1/2004 | Dahlman et al. |
| 2004/0014452 A1 | 1/2004 | Lim et al. |
| 2004/0028078 A1 | 2/2004 | Beckmann |
| 2004/0077357 A1 | 4/2004 | Nakada |
| 2004/0097192 A1 | 5/2004 | Schiff |
| 2004/0103435 A1* | 5/2004 | Yi et al. ............................ 725/81 |
| 2004/0109422 A1 | 6/2004 | Naito |
| 2004/0114593 A1 | 6/2004 | Dick et al. |
| 2004/0114606 A1 | 6/2004 | Haddad |
| 2004/0116143 A1 | 6/2004 | Love et al. |
| 2004/0117860 A1 | 6/2004 | Yi et al. |
| 2004/0125772 A9 | 7/2004 | Wu et al. |
| 2004/0127223 A1 | 7/2004 | Li et al. |
| 2004/0143676 A1 | 7/2004 | Baudry et al. |
| 2004/0147266 A1 | 7/2004 | Hwang et al. |
| 2004/0147271 A1 | 7/2004 | Billon et al. |
| 2004/0157602 A1 | 8/2004 | Khawand |
| 2004/0180675 A1 | 9/2004 | Choi et al. |
| 2004/0184437 A1 | 9/2004 | Lee et al. |
| 2004/0185860 A1 | 9/2004 | Marjelund |
| 2004/0198369 A1 | 10/2004 | Kwak et al. |
| 2004/0202140 A1 | 10/2004 | Kim et al. |
| 2004/0208160 A1 | 10/2004 | Petrovic et al. |
| 2004/0219920 A1 | 11/2004 | Love et al. |
| 2004/0229626 A1 | 11/2004 | Yi et al. |
| 2004/0264497 A1 | 12/2004 | Wang et al. |
| 2004/0264550 A1 | 12/2004 | Dabak |
| 2005/0008035 A1 | 1/2005 | Eklund et al. |
| 2005/0014508 A1 | 1/2005 | Moulsley |
| 2005/0020260 A1* | 1/2005 | Jeong et al. .................... 455/434 |
| 2005/0025039 A1 | 2/2005 | Hwang et al. |
| 2005/0039101 A1 | 2/2005 | Torsner |
| 2005/0054368 A1 | 3/2005 | Amerga |
| 2005/0059407 A1 | 3/2005 | Reed et al. |
| 2005/0063336 A1 | 3/2005 | Kim et al. |
| 2005/0073987 A1 | 4/2005 | Wu |
| 2005/0111393 A1* | 5/2005 | Jeong et al. .................... 370/312 |
| 2005/0118947 A1 | 6/2005 | Ames et al. |
| 2005/0135416 A1 | 6/2005 | Ketchum et al. |
| 2005/0157696 A1 | 7/2005 | Yamamoto et al. |
| 2005/0185608 A1 | 8/2005 | Lee |
| 2005/0190728 A1 | 9/2005 | Han et al. |
| 2005/0197134 A1 | 9/2005 | McKenna et al. |
| 2005/0207374 A1 | 9/2005 | Petrovic et al. |
| 2005/0213605 A1 | 9/2005 | Kim et al. |
| 2005/0243767 A1 | 11/2005 | Zhang et al. |
| 2005/0249141 A1 | 11/2005 | Lee et al. |
| 2005/0250500 A1 | 11/2005 | Xu |
| 2005/0260997 A1 | 11/2005 | Korale |
| 2005/0271025 A1 | 12/2005 | Guethaus et al. |
| 2005/0277429 A1 | 12/2005 | Laroia et al. |
| 2005/0281212 A1 | 12/2005 | Jeong et al. |
| 2005/0288026 A1 | 12/2005 | Byun et al. |
| 2006/0018289 A1 | 1/2006 | Schulist et al. |
| 2006/0025079 A1 | 2/2006 | Sutskover et al. |
| 2006/0045047 A1 | 3/2006 | Choi et al. |
| 2006/0059186 A1 | 3/2006 | Backlund |
| 2006/0062196 A1 | 3/2006 | Cai et al. |
| 2006/0072494 A1 | 4/2006 | Matusz |
| 2006/0088009 A1 | 4/2006 | Gibbs et al. |
| 2006/0143300 A1 | 6/2006 | See et al. |
| 2006/0146745 A1* | 7/2006 | Cai et al. ........................ 370/328 |
| 2006/0168343 A1 | 7/2006 | Ma et al. |
| 2006/0193282 A1 | 8/2006 | Ikawa et al. |
| 2006/0282739 A1 | 12/2006 | Meyer et al. |
| 2006/0292982 A1 | 12/2006 | Ye et al. |
| 2007/0060146 A1 | 3/2007 | Won et al. |
| 2007/0081513 A1 | 4/2007 | Torsner |
| 2007/0098006 A1 | 5/2007 | Parry et al. |
| 2007/0099619 A1 | 5/2007 | Parekh et al. |
| 2007/0121543 A1 | 5/2007 | Kuchibhotla et al. |
| 2007/0133458 A1 | 6/2007 | Chandra et al. |
| 2007/0135080 A1 | 6/2007 | Islam et al. |
| 2007/0140115 A1 | 6/2007 | Bienas et al. |
| 2007/0147326 A1 | 6/2007 | Chen |
| 2007/0191019 A1 | 8/2007 | Fischer et al. |
| 2007/0191020 A1 | 8/2007 | Fischer et al. |
| 2007/0206531 A1 | 9/2007 | Pajukoski et al. |
| 2008/0043619 A1 | 2/2008 | Sammour et al. |
| 2008/0069031 A1 | 3/2008 | Zhang et al. |
| 2008/0095105 A1 | 4/2008 | Sundberg et al. |
| 2008/0232291 A1* | 9/2008 | Hus et al. ...................... 370/312 |
| 2008/0267126 A1 | 10/2008 | Vujcic et al. |
| 2008/0298322 A1 | 12/2008 | Chun et al. |
| 2008/0305819 A1 | 12/2008 | Chun et al. |
| 2009/0010219 A1 | 1/2009 | Lee et al. |
| 2009/0011718 A1 | 1/2009 | Chun et al. |
| 2009/0011769 A1 | 1/2009 | Park et al. |
| 2009/0047912 A1 | 2/2009 | Lee et al. |
| 2009/0129335 A1 | 5/2009 | Lee et al. |
| 2009/0175241 A1 | 7/2009 | Ohta et al. |

| | | |
|---|---|---|
| 2009/0185477 A1 | 7/2009 | Lee et al. |
| 2009/0185535 A1 | 7/2009 | Lee et al. |
| 2009/0219868 A1 | 9/2009 | Lee et al. |
| 2009/0319850 A1 | 12/2009 | Baek et al. |
| 2010/0014430 A1 | 1/2010 | Oka et al. |
| 2010/0034095 A1 | 2/2010 | Ho et al. |
| 2010/0062795 A1 | 3/2010 | Lee |
| 2010/0105334 A1 | 4/2010 | Terry et al. |
| 2010/0167746 A1 | 7/2010 | Lee et al. |
| 2010/0227614 A1 | 9/2010 | Chun et al. |
| 2010/0290400 A1 | 11/2010 | Lee et al. |
| 2011/0038376 A1 | 2/2011 | Wiemann et al. |

FOREIGN PATENT DOCUMENTS

| | | |
|---|---|---|
| DE | 10305358 | 7/2004 |
| EP | 0978958 | 2/2000 |
| EP | 1009184 | 6/2000 |
| EP | 1213939 | 6/2002 |
| EP | 1261222 | 11/2002 |
| EP | 1353523 | 10/2003 |
| EP | 1392074 | 2/2004 |
| EP | 1441473 | 7/2004 |
| EP | 1478203 | 11/2004 |
| EP | 1557968 | 7/2005 |
| EP | 1599063 | 11/2005 |
| EP | 1605724 | 12/2005 |
| EP | 1684538 | 7/2006 |
| JP | 06-013959 | 1/1994 |
| JP | 09-186704 | 7/1997 |
| JP | 09-327072 | 12/1997 |
| JP | 11-308671 | 11/1999 |
| JP | 11331949 | 11/1999 |
| JP | 2000032088 | 1/2000 |
| JP | 2000-151494 | 5/2000 |
| JP | 2000-175271 | 6/2000 |
| JP | 2000-184428 | 6/2000 |
| JP | 2001-095031 | 4/2001 |
| JP | 2001-298770 | 10/2001 |
| JP | 2002501695 | 1/2002 |
| JP | 2002135231 | 5/2002 |
| JP | 2002-374321 | 12/2002 |
| JP | 2003-008635 | 1/2003 |
| JP | 2003504968 | 2/2003 |
| JP | 2003-174470 | 6/2003 |
| JP | 2004-128967 | 4/2004 |
| JP | 2004-320165 | 11/2004 |
| JP | 2004349884 | 12/2004 |
| JP | 2005500761 | 1/2005 |
| JP | 2005510950 | 4/2005 |
| JP | 2005-517369 | 6/2005 |
| JP | 2005522923 | 7/2005 |
| JP | 2005-236988 | 9/2005 |
| JP | 2005-237013 | 9/2005 |
| JP | 2005-244958 | 9/2005 |
| JP | 2005-536168 | 11/2005 |
| JP | 2005-539462 | 12/2005 |
| JP | 2006-014372 | 1/2006 |
| JP | 2006-020044 | 1/2006 |
| JP | 2006-025437 | 1/2006 |
| JP | 2006-505998 | 2/2006 |
| JP | 2007536790 | 12/2007 |
| KR | 10-2001-0111634 | 12/2001 |
| KR | 1020010111637 | 12/2001 |
| KR | 2004-0026153 | 3/2004 |
| KR | 10-2004-0048675 | 6/2004 |
| KR | 20040048675 | 6/2004 |
| KR | 10-2004-0064867 | 7/2004 |
| KR | 20040064867 | 7/2004 |
| KR | 10-2004-0089937 | 10/2004 |
| KR | 20040089937 | 10/2004 |
| KR | 2004-0096389 | 11/2004 |
| KR | 10-2005-0122979 | 12/2005 |
| KR | 10-2006-0016436 | 2/2006 |
| KR | 10-2006-0040367 | 5/2006 |
| RU | 2168278 | 5/2001 |
| RU | 2191479 | 10/2002 |
| RU | 2232469 | 7/2004 |
| RU | 2232477 | 7/2004 |
| RU | 2237380 | 9/2004 |
| RU | 2259016 | 8/2005 |
| RU | 2005115869 | 10/2005 |
| RU | 2270526 | 2/2006 |
| TW | 407407 | 10/2000 |
| TW | 552815 | 9/2003 |
| TW | 586283 | 5/2004 |
| TW | 589818 | 6/2004 |
| TW | 592412 | 6/2004 |
| TW | 200522579 | 7/2005 |
| TW | I242951 | 11/2005 |
| TW | 280755 | 5/2007 |
| WO | 9960729 | 11/1999 |
| WO | 99/63713 | 12/1999 |
| WO | 01/35586 | 5/2001 |
| WO | 02/39760 | 5/2002 |
| WO | 02/43403 | 5/2002 |
| WO | 02/47417 | 6/2002 |
| WO | 02-075442 | 9/2002 |
| WO | 02/102110 | 12/2002 |
| WO | 03/007636 | 1/2003 |
| WO | 03-015439 | 2/2003 |
| WO | 03/017691 | 2/2003 |
| WO | 03/043259 | 5/2003 |
| WO | 03/047155 | 6/2003 |
| WO | 03/056723 | 7/2003 |
| WO | 03/096571 | 11/2003 |
| WO | 2004/030393 | 4/2004 |
| WO | 2004/034656 | 4/2004 |
| WO | 2004045234 | 5/2004 |
| WO | 2004/089030 | 10/2004 |
| WO | 2004/091130 | 10/2004 |
| WO | 2005/034418 | 4/2005 |
| WO | 2005/055472 | 6/2005 |
| WO | 2005/074312 | 8/2005 |
| WO | 2005/088886 | 9/2005 |
| WO | 2005099125 | 10/2005 |
| WO | 2005/109695 | 11/2005 |
| WO | 2005/109837 | 11/2005 |
| WO | 2005/125125 | 12/2005 |
| WO | 2006/011953 | 2/2006 |
| WO | 2007/095966 | 8/2007 |
| WO | 2007091831 | 8/2007 |

OTHER PUBLICATIONS

Xu, H., et al.; "Performance Analysis on the Radio Link Control Protocol of UMTS System"; 2002 IEEE 56th Vehicular Technology Conference Proceedings; pp. 2026-2030; Sep. 2002.

M. Haardt et al., "The TD-CDMA Based UTRA TDD Mode," IEEE Journal on Selected Areas in Communications, vol. 18, No. 8, pp. 1375-1385, Aug. 2000.

Siemens, "States in E-UTRAN," R2-052051, 3GPP TSG-RAN WG RAN2#48, Aug. 2005.

China Mobile Communications Co., "RRC States Analysis in LTE," R2-052140, 3GPP TSG RAN WG2 #48, Aug. 2005.

Qualcomm Europe, "Signaling optimization for E-UTRAN," R2-052407, 3GPP TSG-RAN WG 2 meeting #48-bis, Oct. 2005.

Panasonic, "E-UTRA Transport and Logical Channels," R2-052860, 3GPP TSG RAN WG2#49, Nov. 2005.

Chun, S.D., "Data Transmission Method and Data Re-Transmission Method," U.S. Appl. No. 12/961,451, Dec. 6, 2010.

Fischer, P., "MBMS Dual Receiver," U.S. Appl. No. 12/961,417, Dec. 6, 2010.

LG Electronics Inc., "UE state transition in LTE_ACTIVE," 3GPP TSG-RAN WG2#52, R2-061002, Mar. 27, 2006.

Ericsson, "LTE States in E-UTRAN," 3GPP TSG-RAN WG2 Meeting #48bis, R2-052425, Oct. 10, 2005.

Sarkar, S., et al., "Common-Channel Soft Handoff in CDMA2000," IEEE Transactions on Microwave Theory and Techniques, Jun. 2000, pp. 938-950, vol. 48, Issue 6.

NTT Docomo, et al., "Multiplexing Method of Shared Control Channel in Uplink Single-Carrier FDMA Radio Access," 3GPP TSG-RAN WG1, R1-051143, Oct. 10, 2005.

Huawei, "Further Considerations on Multiplexing Method of Shared Control Channel in Uplink Single-Carrier FDMA," 3GPP TSG-RAN WG1, R1-051430, Nov. 7, 2005.

Philips, "Evolved Paging Indicators for LTE," 3GPP TSG-RAN WG2, R2-052985, Nov. 7, 2005.

NTT Docomo, et al., "Paging Channel Structure for E-UTRA Downlink," 3GPP TSG-RAN WG1, R1-060034, Jan. 23, 2006.

LG Electronics Inc., "HARQ and ARQ Operation," 3GPP TSG-RAN WG2, R2-060106, Jan. 9, 2006.

LG Electronics Inc., "Framing in the MAC Entity," 3GPP TSG-RAN WG2, R2-061012, Mar. 27, 2006.

Motorola, "Paging Channel Design for E-UTRA," 3GPP TSG-RAN WG1, R1-061712, Jun. 27, 2006.

3rd Generation Partnership Project (3GPP), "Technical Specification Group Radio Access Network; Evolved Universal Terrestrial Radio Access (E-UTRA) Medium Access Control (MAC) protocol specification (Release 8)," 3GPP TS 36.321, V8.4.0, Dec. 2008.

LG Electronics Inc., "UE State Transition in LTE_ACTIVE," R2-061002, 3GPP TSG-RAN WG2 #52, Mar. 2006.

* cited by examiner

[Fig. 1]
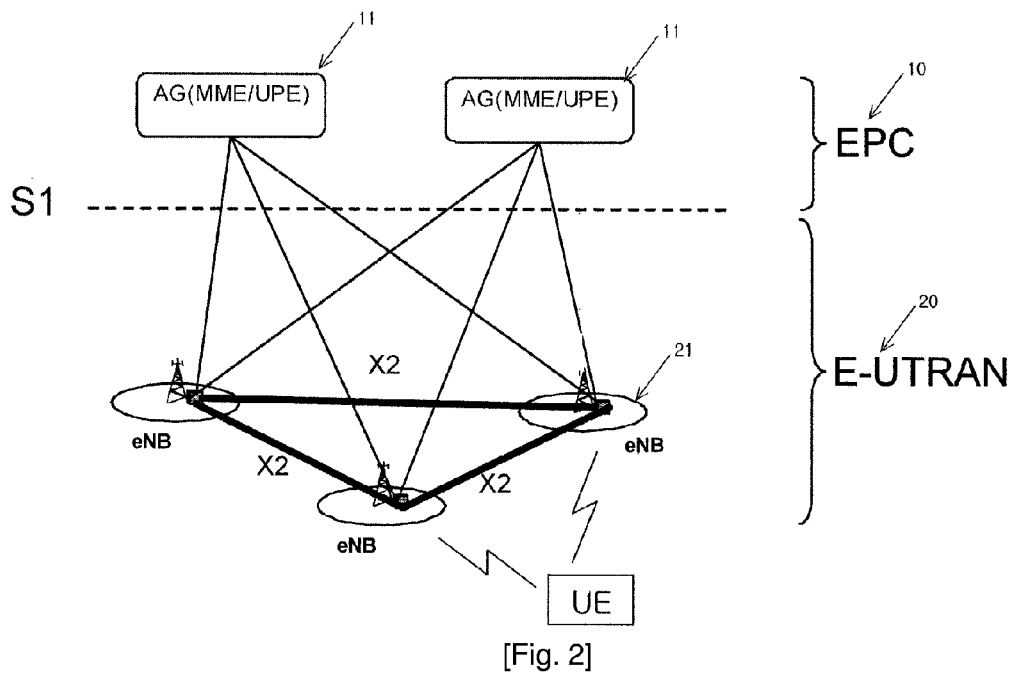
[Fig. 2]
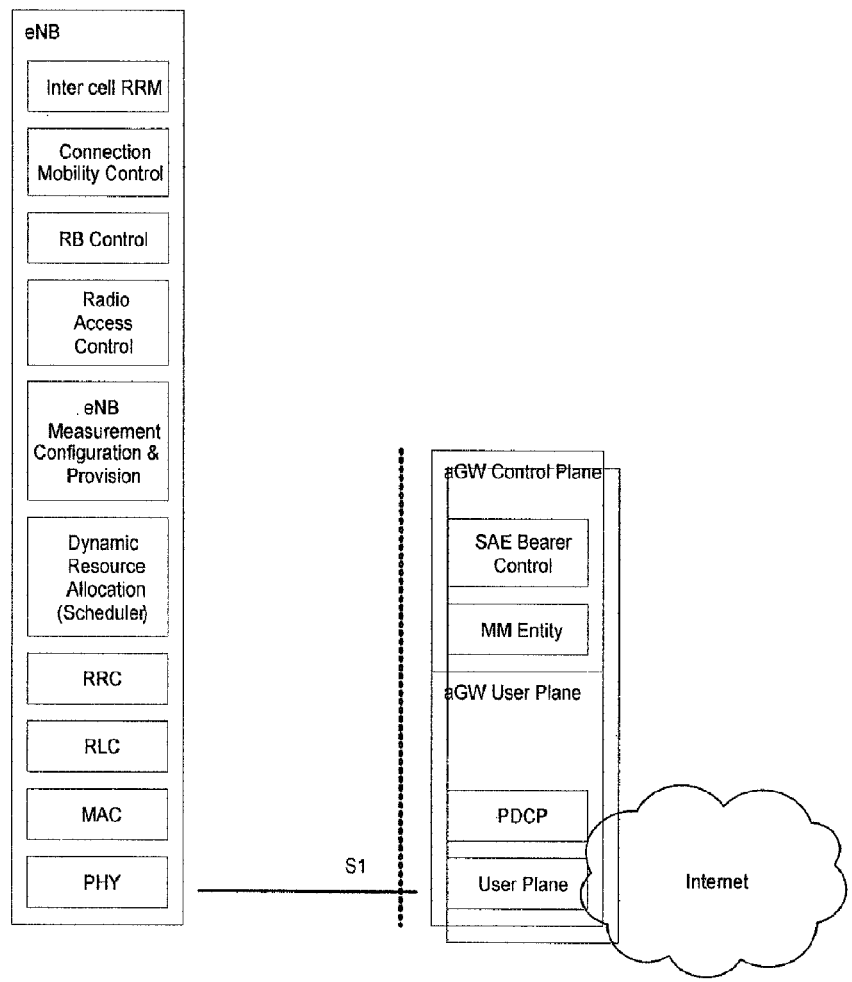

[Fig. 3]
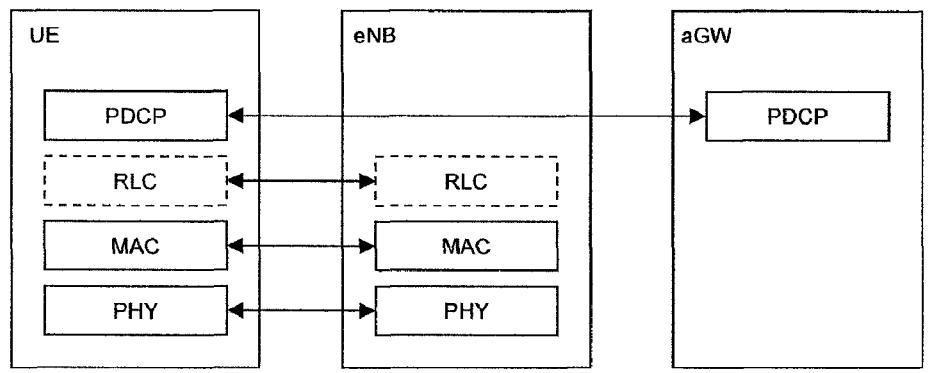
[Fig. 4]
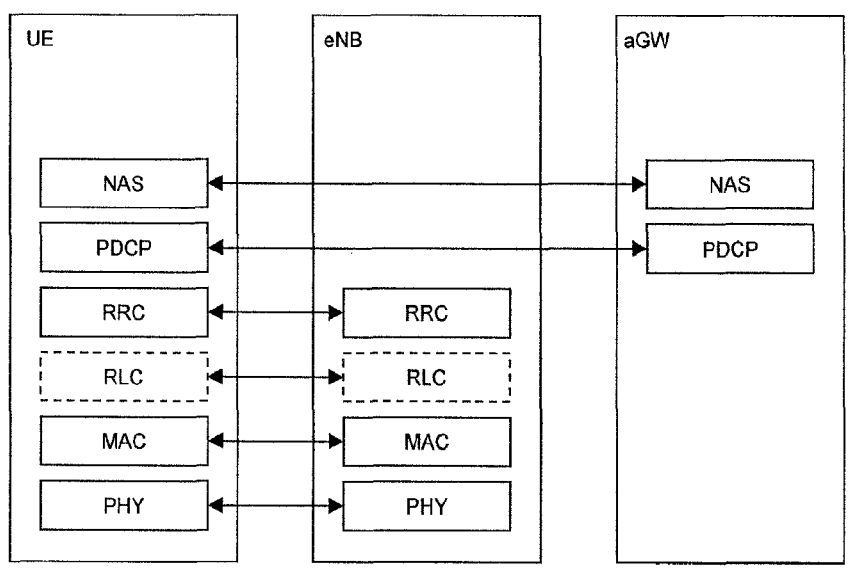
[Fig. 5]
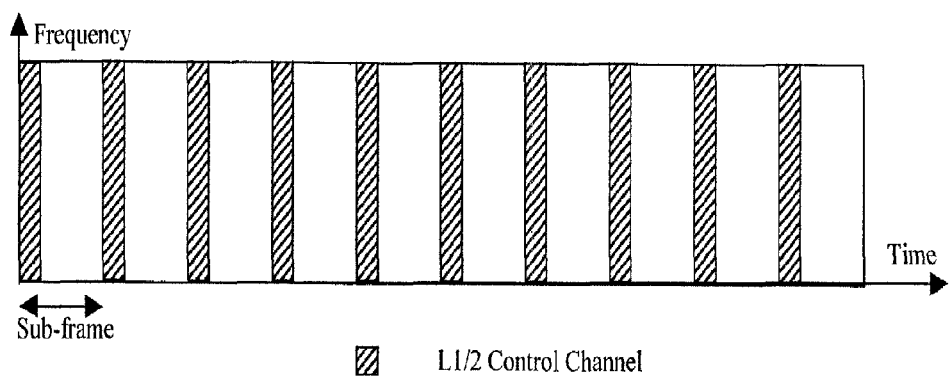

[Fig. 6]
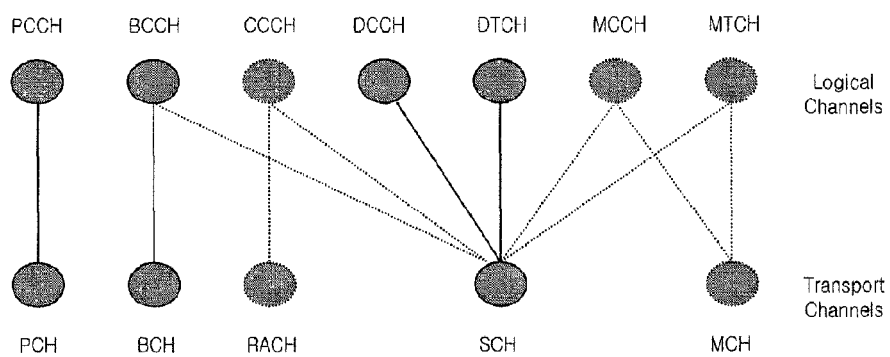
[Fig. 7]
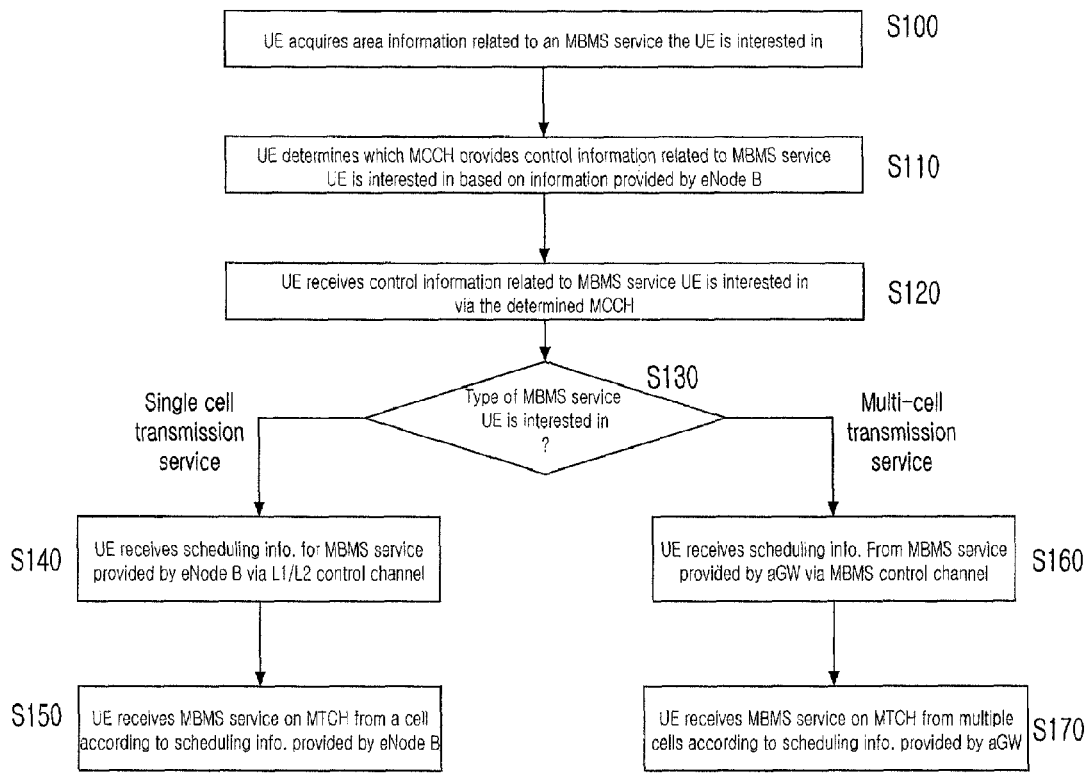

POINT-TO-MULTIPOINT SERVICE COMMUNICATION

CROSS-REFERENCE TO RELATED APPLICATIONS

This application is a National Stage filing under 35 U.S.C. 371 of International Application No. PCT/KR2007/000066, filed on Jan. 4, 2007, which claims the benefit of earlier filing date and right of priority to Korean Application No. 10-2007-0000767, filed on Jan. 3, 2007, and also claims the benefit of U.S. Provisional Application Nos. 60/797,402, filed on May 2, 2006, 60/784,976, filed on Mar. 22, 2006, 60/784,680, filed on Mar. 21, 2006, and 60/757,063, filed on Jan. 5, 2006.

DISCLOSURE OF INVENTION

Technical Solution

This disclosure relates to point-to-multipoint service communication.

FIG. 1 is an exemplary network structure of the E-UMTS, which is a type of a mobile communication system.

The E-UMTS system has been evolved from the UMTS system, for which the 3GPP organization is proceeding with the preparation of the basic specifications applicable thereto. The E-UMTS system may be referred to as a Long Term Evolution (LTE) system.

With reference to FIG. 1, the E-UMTS network is divided into an E-UTRAN 20 and an EPC (Evolved Packet Core) 10. The E-UTRAN 20 includes a base station (eNB or eNodeB) 21. The access gateway (AG) 11 can be divided into a part for handling user traffic and a part for handling control traffic. The AG part for handling new user traffic and the AG part for handling control traffic can communicate with each other via newly defined interface.

One or more cells may exist for a single eNodeB (eNB) 21, and an interface for transmitting user traffic and/or control traffic can be used between the eNodeBs.

The EPC 10 may include an AG 11, a node for user registration of the UE, and the like. Also, in the UMTS of FIG. 1, an interface for discriminating the E-UTRAN 20 and the EPC 10 can be used. An S1 interface can connect a plurality of nodes (i.e., in a many-to-many manner) between the eNodeB 21 and the AG 11. The eNodeBs are connected with each other through an X2 interface, and the X2 interface is always present between adjacent eNodeBs in a meshed network structure.

FIG. 2 shows an exemplary structure (architecture) of an E-UTRAN. Here, the eNB may perform functions of selection for Access gateway (AG), a routing toward the AG during a Radio Resource Control (RRC) activation, a scheduling and transmitting of paging messages, a scheduling and transmitting of Broadcast Channel (BCCH) information, a dynamic allocation of resources to UEs in both a uplink and a downlink, a configuration and provision of eNB measurements, a radio bearer control, a radio admission control (RAC), and a connection mobility control in LTE_ACTIVE state.

In the E-UTRAN, the AG may perform functions of a paging origination, a LTE-IDLE state management, a ciphering of the user plane, supporting a Packet Data Convergence Protocol (PDCP) function, a System Architecture Evolution (SAE) bearer control, and a ciphering and integrity protection of Non-Access Stratum (NAS) signalling.

FIG. 3 and FIG. 4 show the user-plane protocol and the control-plane protocol stack for the E-UTRAN. Here, the protocol layers can be divided into a first layer (L1), a second layer (L2) and a third layer (L3) based upon the three lower layers of an open system interconnection (OSI) standard model that is well-known in the art of communication systems.

The physical layer, which is a first layer, provides an information transmission service to an upper layer by using a physical channel. The physical layer is connected with a medium access control (MAC) layer (located at a higher level) through a transport channel, and data between the MAC layer and the physical layer is transferred via the transport channel. Between different physical layers, namely, between physical layers of a transmission side and a reception side, data is transferred via the physical channel.

The MAC layer of Layer 2 provides services to a radio link control (RLC) layer (which is a higher layer) via a logical channel. The RLC layer of Layer 2 supports the transmission of data with reliability. It should be noted that the RLC layer in FIGS. 3 and 4 is depicted in dotted lines, because if the RLC functions are implemented in and performed by the MAC layer, the RLC layer itself may not need to exist.

The PDCP layer of Layer 2 performs a header compression function that reduces unnecessary control information such that data being transmitted by employing Internet protocol (IP) packets, such as IPv4 or IPv6, can be efficiently sent over a radio (wireless) interface that has a relatively small bandwidth.

A radio resource control (RRC) layer located at the lowest portion of the third layer (L3) is only defined in the control plane and controls logical channels, transport channels and the physical channels in relation to the configuration, reconfiguration, and release of the radio bearers (RBs). Here, the RB signifies a service provided by the second layer (L2) for data transmission between the terminal and the UTRAN.

In FIG. 3, the RLC and MAC layers (terminated in an eNB on the network side) may perform functions such as Scheduling, Automatic Repeat Request (ARQ), and Hybrid Automatic Repeat Request (HARQ). The PDCP layer (terminated in an AG on the network side) may perform for the user plane functions such as a header compression, an integrity protection, and ciphering.

In FIG. 4, the RLC and MAC layers (terminated in an eNB on the network side) perform the same functions as for the user plane. Here, the RRC layer (terminated in an eNB on the network side) may perform functions such as broadcasting, paging, RRC connection management, Radio Bearer (RB) control, mobility functions, and UE measurement reporting and controlling. The PDCP layer (terminated in an aGW on the network side) may perform functions for the control plane such as, an integrity protection and ciphering. The NAS (terminated in an aGW on the network side) may perform functions such as a SAE bearer management, an authentication, an idle mode mobility handling, a paging origination in LTE_IDLE, and a security control for the signalling between aGW and UE, and for the user plane.

The NAS may be divided into three different states. First, a LTE_DETACHED state if there is no RRC entity in the NAS; second, a LTE_IDLE state if there is no RRC connection while storing minimal UE information; and third, a LTE_ACTIVE state if the RRC connection is established. Also, the RRC may be divided into two different states such as a RRC_IDLE and a RRC_CONNECTED. In RRC_IDLE state, the UE may receive broadcast of system information and paging information while the UE specifies a Discontinuous Reception (DRX) configured by NAS, and the UE has been allocated an identification (ID) which uniquely identifies the UE in a tracking area. Also, in RRC-IDLE state, no RRC context is stored in the eNB. In RRC_CONNECTED state, the UE has an E-UTRAN RRC connection and a context in the E-UTRAN, as such transmitting and/or receiving data to/from the network (eNB) become possible. Also, the UE can report channel quality information and feedback information to the eNB. In RRC_CONNECTED state, the E-UTRAN knows the cell which the UE belongs to, such that the network can transmit and/or receive data to/from UE, the network can control mobility (handover) of the UE, and the network can perform cell measurements for a neighboring cell.

In RRC_IDLE mode, the UE specifies the paging DRX (Discontinuous Reception) cycle. Namely, the UE monitors a paging signal at a specific paging occasion of every UE specific paging DRX cycle. The paging occasion is a time interval where a paging signal is transmitted. The UE has its own paging occasion. A paging message is transmitted over all cells belonging to the same tracking area. If the UE moves from one tracking area to another tracking area, the UE will send a tracking area update message to the network to update its location.

FIG. 5 shows an exemplary structure of the physical channel. The physical channel transfers signalling and data between the UE Layer 1 (L1) and the eNB Layer 1 (L1). As shown in FIG. 5, the physical channel transfers the signalling and the data with a radio resource which consists of one or more sub-carriers in frequency and one or more symbols in time (i.e., 6 or 7 symbols constitute one sub-frame which is 0.5 ms in length). The particular symbol(s) of the sub-frame (e.g. the first symbol of the sub-frame) can be used for the L1/L2 control channel. The L1/L2 control channel carries L1/L2 control information (signalling).

FIG. 6 shows a possible mapping relationship between logical channels and transport channels. In general, the transport channel transfers the signalling and data between L1 and MAC layers, and the physical channel is mapped to the transport channel. Types of downlink transport channels can be described as follows; 1. Broadcast Channel (BCH) used for transmitting system information, 2. Downlink Shared Channel (DL-SCH) characterised by: a) support for HARQ, b) support for dynamic link adaptation by varying the modulation, coding and transmit power, c) possibility to be broadcast in the entire cell, d) possibility to use beamforming, and e) support for both dynamic and semi-static resource allocation, 3. Paging Channel (PCH) used for paging a UE, and 4. Multicast Channel (MCH) used for multicast or broadcast service transmission. Also, types of uplink transport channels can be described as follows; 1. Uplink Shared Channel (UL-SCH) characterised by: a) possibility to use beamforming; (likely no impact on specifications), b) support for dynamic link adaptation by varying the transmit power and potentially modulation and coding, and c) support for HARQ, and 2. Random Access Channel(s) (RACH) used normally for initial access to a cell.

In general, the MAC layer provides data transfer services on the logical channels. As such, a set of the logical channel types is defined for different kinds of data transfer services as offered by the MAC layer. Each logical channel type is defined by what type of information is transferred. For example, the logical channels are classified into two groups: control channels (for the transfer of control plane information) and traffic channels (for the transfer of user plane information). The control channels are used for transfer of control plane information only. A few examples of the control channels offered by MAC are as follows: 1. Broadcast Control Channel (BCCH) which is a downlink channel for broadcasting system control information; 2. Paging Control Channel (PCCH) which is a downlink channel that transfers paging information. This channel is used when the network does not know the location cell of the UE; 3. Common Control Channel (CCCH) which is used by the UEs when there is no RRC connection between the UEs and the network; 4. Multicast Control Channel (MCCH) which is a point-to-multipoint downlink channel used for transmitting MBMS control information from the network to the UE; and 5. Dedicated Control Channel (DCCH) which is a point-to-point bi-directional channel that transmits dedicated control information between a UE and the network. The DCCH is used by the UEs having an RRC connection.

The traffic channels are used for transfer of user plane information only. A few examples of the traffic channels offered by MAC are as follows: 1. Dedicated Traffic Channel (DTCH) which is a point-to-point channel, dedicated to one UE, for the transfer of user information. The DTCH can exist in both the uplink and downlink, and 2. Multicast Traffic Channel (MTCH) which is a point-to-multipoint downlink channel for transmitting traffic data from the network to the UE. The different logical channels are mapped onto different transport channels. For example, in the uplink, the DCCH may be mapped to an UL-SCH, and the DTCH may be mapped to an UL-SCH. Also, in the downlink, the BCCH may be mapped to a BCH, the PCCH may be mapped to a PCH, the DCCH may be mapped to a DL-SCH, and the DTCH may be mapped to a DL-SCH.

The present inventors recognized at least the following problems in currently existing point-to-multipoint service communications. Namely, control information about cell specific service and non-cell specific service was provided by one point-to-multipoint control channel i.e. MCCH. Thus, signaling and scheduling of cell specific service and non-cell specific service cannot be optimized according to characteristics of the services. For example, control information about non-cell specific service can be combined across cells and so radio resource can be saved. However, the control channel provides control information about cell specific service as well as non-cell specific service. Therefore, the control channel cannot support combining and so control information about non-cell specific service cannot be combined. This results in wasteful usage of radio resource. Based upon such problem recognition, various features and aspects described herein have been conceived by the present inventors.

The present disclosure is directed to receiving a point-to-multipoint service in a wireless communication system.

Additional aspects of exemplary embodiments will be set forth in the description which follows, and in part will be apparent from the description, or may be learned by practice of the embodiment(s) and features herein. The aspects of exemplary embodiments may be realized and attained by the structure particularly pointed out in the written description and claims hereof as well as the appended drawings.

To achieve these aspects in accordance with the exemplary embodiments, as embodied and broadly described, the features are embodied in a method for receiving a point-to-multipoint service in a wireless communication system, the method comprising selecting a point-to-multipoint control channel among a plurality of point-to-multipoint control channels provided by a cell, wherein the point-to-multipoint control channel is selected according to a desired (preferred) way of receiving the point-to-multipoint service, receiving control information related to the point-to-multipoint service through the selected point-to-multipoint control channel, and receiving the point-to-multipoint service according to the control information.

In one aspect, the desired (preferred) way of receiving the point-to-multipoint service comprises receiving the point-tomultipoint service in a single cell. The control information comprising scheduling information may be received on an L1/L2 control channel. The point-to-multipoint service may be received on a downlink shared channel. The method may further comprise utilizing a retransmission scheme based on uplink feedback. The control information comprising scheduling information may be received from an eNode B.

In another aspect, the desired (preferred) way of receiving the point-to-multipoint service comprises receiving the point-to-multipoint service in multiple cells. The control information comprising scheduling information may be received on an MBMS control channel (MCCH). The point-to-multipoint service may be received on a multicast channel using an L1 combining technique. The control information comprising scheduling information may be received from a center node.

In accordance with another embodiment, a method for receiving a point-to-multipoint service in a wireless communication system comprises selecting a point-to-multipoint control channel among a plurality of point-to-multipoint control channels provided by a cell, wherein the point-to-multipoint control channel is selected according to an area of where the point-to-multipoint service is provided, receiving control information related to the point-to-multipoint service through the selected point-to-multipoint control channel, and receiving the point-to-multipoint service according to the control information.

In one aspect, the point-to-multipoint service may be provided to a single cell. The control information comprising scheduling information may be received on an L1/L2 control channel. The point-to-multipoint service may be received on a downlink shared channel. The method may further comprise utilizing a retransmission scheme based on uplink feedback. The control information comprising scheduling information may be received from an eNode B.

In another aspect, the point-to-multipoint service may be provided to multiple cells. The control information comprising scheduling information may be received on an MBMS control channel (MCCH). The point-to-multipoint service may be received on a multicast channel using an L1 combining technique. The control information comprising scheduling information may be received from a center node.

In accordance with another embodiment, a method for transmitting a point-to-multipoint service in a wireless communication system comprises providing a plurality of point-to-multipoint control channels to a cell, transmitting control information to a mobile terminal through a point-to-multipoint control channel selected among the plurality of point-to-multipoint control channels by the mobile terminal, wherein the point-to-multipoint control channel is selected according to a desired (preferred) way of transmitting the point-to-multipoint service, and transmitting the point-to-multipoint service according to the control information.

In one aspect, the desired (preferred) way of transmitting the point-to-multipoint service comprises transmitting the point-to-multipoint service to a single cell. The control information comprising scheduling information may be transmitted on an L1/L2 control channel.

The point-to-multipoint service may be transmitted on a downlink shared channel. The method may further comprise utilizing a retransmission scheme based on uplink feedback. The control information comprising scheduling information may be transmitted from an eNode B.

In another aspect, the desired (preferred) way of transmitting the point-to-multipoint service comprises transmitting the point-to-multipoint service to multiple cells. The control information comprising scheduling information may be transmitted on an MBMS control channel (MCCH). The point-to-multipoint service may be transmitted on a multicast channel using an L1 combining technique. The control information comprising scheduling information may be transmitted from a center node.

In accordance with another embodiment, a method for transmitting a point-to-multipoint service in a wireless communication system comprises providing a plurality of point-to-multipoint control channels to a cell, transmitting control information to a mobile terminal through a point-to-multipoint control channel selected among the plurality of point-to-multipoint control channels by the mobile terminal, wherein the point-to-multipoint control channel is selected according to an area of where the point-to-multipoint service is provided, and transmitting the point-to-multipoint service according to the control information.

In one aspect, the point-to-multipoint service may be provided to a single cell. The control information comprising scheduling information may be transmitted on an L1/L2 control channel. The point-to-multipoint service may be transmitted on a downlink shared channel. The method may further comprise utilizing a retransmission scheme based on uplink feedback. The control information comprising scheduling information may be transmitted from an eNode B.

In another aspect, the point-to-multipoint service may be provided to multiple cells. The control information comprising scheduling information may be transmitted on an MBMS control channel (MCCH). The point-to-multipoint service may be transmitted on a multicast channel using an L1 combining technique. The control information comprising scheduling information may be transmitted from a center node.

It is to be understood that both the foregoing general description and the following detailed description of various features are exemplary and explanatory and are intended to provide further explanation of the claims.

The accompanying drawings, which are included to provide further understanding and are incorporated in and constitute a part of this specification, illustrate various exemplary embodiments and together with the description serve to explain the principles herein.

FIG. 1 illustrates an exemplary network structure of an Evolved Universal Mobile Telecommunications System (E-UMTS).

FIG. 2 illustrates an exemplary structure of a E-UTRAN.

FIG. 3 illustrates an exemplary user plane protocol stack of the E-UTRAN.

FIG. 4 illustrates an exemplary control plane protocol stack of the E-UTRAN.

FIG. 5 illustrates an exemplary structure of a physical channel.

FIG. 6 illustrates a mapping relationship of between logical channels and transport channels.

FIG. 7 illustrates an exemplary method for receiving a point-to-multipoint service in a wireless communication system.

This disclosure relates to point-to-multipoint service communication in a wireless communication system.

In accordance with one embodiment, two types of service scenarios exist for multicast/broadcast transmissions, cell specific contents and cell group contents. The cell specific contents comprise cell broadcasting services such as message distribution on a specific cell, which are carried in a single cell transmission manner. The cell group contents comprise broadcasting services on multiple cells such as television broadcasts, which are carried in a multi-cell transmission manner.

In accordance with one embodiment, multi-cell and single cell transmissions are managed differently in terms of scheduling and combining. The single cell transmission may be scheduled by the eNode B, whereas the multi-cell transmission may be scheduled by a center node such as the aGW. Also, the single cell transmission may be provided on a downlink shared channel (DL-SCH), whereas the multi-cell transmission may be provided on a different channel, such as a multicast channel (MCH) that is L1 combinable. However, the single cell transmission may be also provided on the MCH instead of the DL-SCH.

The multi-cell transmission may use an L1 combining technique. Therefore, the center node functions as a source of multi-cell transmissions in the network. In this case, a same service transmission may be provided over a cell group which comprises cells transmitting the same service.

In contrast, the single cell transmission cannot be combined across eNode Bs because the single cell transmission covers only one cell or one eNode B. However, the single cell transmission can be combined within the same eNode B if the network supports combining.

The center node such as the aGW is the source of multi-cell transmissions. The aGW also schedules multi-cell transmissions for a group of cells. The aGW may apply semi-static scheduling to multi-cell transmissions in order to apply scheduling to a group of cells. Scheduling information may be provided by in-band signaling on an MBMS control channel, such as an MBMS scheduling channel (MSCH) mapped to the same physical channel carrying an MBMS traffic channel (MTCH).

For a single cell transmission, the eNode B instead of the aGW, dynamically schedules the single cell transmission in consideration with scheduling of unicast and other common channels. The eNode B may first schedule unicast data according to a channel quality report and then schedules single cell transmissions with downlink resources not scheduled for the unicast data. Scheduling information of the single cell transmission may be provided via L1/L2 control information. The L1/L2 control information may comprise an MBMS service identity as well as a UE identity.

The single cell transmission on the DL-SCH can support adaptive modulation and coding (AMC) and HARQ schemes for a relatively small number of users receiving a multicast service. An ARQ layer providing an ARQ function at the eNode B can repeat transmission of the same MBMS packets or the same text/multimedia messages. Thus, if a UE loses one packet or message, the UE can acquire the lost packet or message later.

The scheduling information on the L1/L2 control channel for a time interval (e.g. one or more transmission time interval (TTI)) indicates short-term scheduling information of an MBMS service transmission within the time interval. Thus, if the UE acquires the short-term scheduling information of an MBMS service transmission the UE wishes to receive by receiving L1/L2 control channel at a time interval, the UE receives MBMS traffic or control information for the MBMS service transmission at the time interval by receiving a downlink resource (e.g. time/frequency/code) indicated by the received short-term scheduling information.

Moreover, the UE can receive long-term scheduling information relating to the MBMS service transmission from a cell. The long-term scheduling information indicates when the MBMS service transmission is available. Accordingly, the UE receives an L1/L2 control channel for a period indicated by the received long-term scheduling information in order to acquire the short-term scheduling information of the MBMS service transmission.

In accordance with one embodiment, the center node (aGW) transfers information related to multi-cell transmissions, e.g. information on scheduling/combining, to the eNode B to control multi-cell transmissions. The eNode B then transmits some control information received from the aGW on either a multicast control channel (MCCH) or MBMS scheduling channel (MSCH). Thus, no RRC layer at the aGW exists. The RRC layer at the eNode B may control multicast/broadcast transmissions with the control information received from the aGW.

The PDCP layer performs header compression of MBMS services. The PDCP layer for an MBMS transmission may be located at the center node (aGW). Furthermore, there may be one PDCP entity per cell group for one service, and the cell group may be managed by the aGW.

The DL-SCH for an MBMS service may not apply ACK/NACK and CQI reporting to MBMS transmissions. Moreover, multiplexing of MBMS and dedicated services onto the same DL-SCH may not be allowed. However, the MAC layer may support an ARQ function for MBMS. In this case, ARQ or HARQ schemes may be applied in a fixed manner without ACK/NACK from the UE. The number of retransmissions for ARQ or HARQ may be fixed, e.g. 2 or 3 times, and retransmission on the DL-SCH may be synchronous to reduce the length of signaling. In view of this, the DL-SCH for MBMS may be different from the DL-SCH for dedicated services.

In accordance with one embodiment, a multicast/broadcast service will contain cell specific information. If cells are different, MBMS control information such as service information, radio bearer (RB) information and scheduling information may be different in different cells. Thus, the MCCH may be configured for each cell to be capable of transferring cell specific MBMS control information.

The MCCH may provide service information listing all available services in a cell and information related to point-to-multipoint radio bearers (PTM RBs) on the DL-SCH and the multicast channel (MCH) for each service. Based on the MCCH information, the UE knows how to configure the PTM RB on the DL SCH or the PTM RB on the MCH for a service the UE is interested in.

The MCCH can be mapped to a broadcast channel (BCH), MCH or DL-SCH. If the MCCH is mapped to the BCH, MBMS control information on the MCCH may be repeated as system information on a broadcast control channel (BCCH) and different MCCH information are treated as several system information blocks (SIBs) on the BCH. In this case, the BCH can be flexibly allocated to any resource block(s). If there is no flexibility of allocation on the BCH, the MCCH can be mapped on the DL-SCH.

For a multi-cell transmission, the network may transmit semi-static scheduling of MBMS services by in-band signaling on the MCH. The in-band signaling is soft combined; therefore, the UE can combine in-band signaling from multiple cells transmitting the same scheduling information. The MSCH may be used for the in-band signaling, wherein the MSCH is mapped to the MCH. The in-band signaling on the MSCH may comprise information related to time/frequency allocation of MBMS traffic and information on modulation and coding set (MCS). The MCS indicates the type of modulation/coding scheme used for an MBMS transmission.

For a single cell transmission, L1/L2 control information may be used instead of the MSCH. L1/L2 control information may also control a UE's discontinuous reception (DRX) of the DL-SCH for a single cell transmission of a multicast/broadcast service. Here, the UE monitors the L1/L2 control information at a specific interval during a certain period. If the UE finds a service identity of a service the UE is interested in included in the L1/L2 control information, the UE receives MBMS traffic data on the DL-SCH according to the resource allocation included in the L1/L2 control information.

In accordance with one embodiment, if a frequency band of a cell comprises 20 Mhz, a method for providing MBMS services in the cell comprises providing multicast/broadcast services on a lower 10 Mhz and unicast services on an upper 10 Mhz. Alternatively, a method for providing MBMS services in the cell comprises providing multicast/broadcast services on a central 10 Mhz portion of the frequency band and unicast services on a portion of the frequency band outside of the central 10 Mhz portion.

Accordingly, if cell bandwidth, e.g. 20 Mhz, is larger than a minimum UE bandwidth, e.g. 10 Mhz, the UE can indicate reception of, or a preference for receiving, a multicast/broadcast service to the eNode B because the eNode B may not know if the UE is receiving, or wishes to receive, the multicast/broadcast service. After receiving the UE indication, the eNode B may move a unicast service onto the 10 Mhz that the multicast/broadcast service is transmitted on. This helps the UE receive both the multicast/broadcast service and the unicast service.

However, the eNode B may not be able to move the unicast service onto the 10 Mhz that the multicast/broadcast service is transmitted on because of an eNode B resource status. Accordingly, the eNode B cannot help the UE receive both services simultaneously. In this case, the UE preferably selects which service to receive between the unicast and multicast/broadcast services.

In accordance with one embodiment, UE capability may be dynamically updated by signaling between the UE and the eNode B. Since the eNode B may not know which multicast/broadcast service the UE intends to receive, the UE calculates the available processing and reception resources based on the resources a broadcast channel would occupy. Thereafter, the UE reports the calculated processing and reception resource information to the eNode B. The information exchanged between the UE and an eNode B scheduler may comprise a number of sub-carriers and processes used for a unicast service.

FIG. 7 illustrates a method for receiving a point-to-multipoint service in a wireless communication system in accordance with one embodiment. In FIG. 7, an MBMS service is specifically referred to; however, it is contemplated that the features described herein may apply to any type of point-to-multipoint communication service.

Referring to FIG. 7, a UE acquires area information related to an MBMS service the UE is interested in (S100). The MBMS service may be provided via a single cell transmission or a multi-cell transmission. Thereafter, the UE determines which MCCH provides control information related to the MBMS service the UE is interested in based on information provided by the eNode B (S110). In one aspect, the UE may select an MCCH according to a desired (preferred) way of receiving the MBMS service, i.e. a preference for receiving the MBMS service via single cell or multi-cell transmission. In another aspect, the UE may select the MCCH according to an area of where the MBMS service is provided. After selecting the appropriate MCCH, the UE receives the control information related to the MBMS service the UE is interested in via the appropriate MCCH (S120).

Accordingly, the method for receiving the MBMS service the UE is interested will differ according to the type of MBMS service (S130). If the MBMS service is a single cell transmission service, the UE receives scheduling information for the MBMS service, provided by the eNode B, via an L1/L2 control channel (S140). The UE then receives the MBMS service on an MTCH from a cell according to the scheduling information provided by the eNode B (S150).

However, if the MBMS service is a multi-cell transmission service, the UE receives scheduling information for the MBMS service, provided by the aGW, via an MBMS control channel (S160). The UE then receives the MBMS service on an MTCH from multiple cells according to the scheduling information provided by the aGW (S170).

As for the utility of the features in the described embodiment(s), it can be clearly understood that such features may be applied to various types of wireless communication technologies that support point-to-multipoint service communications, such as the E-UMTS system, which is a type of LTE (Long Term Evolution) system.

Although the present disclosure is described in the context of mobile communication, the present features may also be used in any wireless communication systems using mobile devices, such as PDAs and laptop computers equipped with wireless communication capabilities. Moreover, the use of certain terms to describe the present disclosure should not limit the scope of the embodiment(s) to certain types of wireless communication system, such as UMTS. The present features are also applicable to other wireless communication systems using different air interfaces and/or physical layers, for example, TDMA, CDMA, FDMA, WCDMA, etc.

The exemplary embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium is accessed and executed by a processor. The code in which the exemplary embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of this disclosure, and that the article of manufacture may comprise any information bearing medium known in the art.

The foregoing embodiments and advantages are merely exemplary and are not to be construed to be limiting. The present teachings can be readily applied to other types of apparatuses. The description herein is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

The invention claimed is:

1. A method for receiving a point-to-multipoint service at a user equipment (UE) in a wireless communication system, the method comprising:

selecting, by the UE, between the point-to-multipoint service is to be received in a single cell and the point-to-multipoint service is to be received in a plurality of cells;

selecting, by the UE, a point-to-multipoint control channel among a plurality of point-to-multipoint control channels according to the selection between the point-to-multipoint service is to be received in the single cell and the point-to-multipoint service is to be received in the plurality of cells, wherein an L1/L2 control channel is selected if the point-to-multipoint service is to be received in the single cell is selected, and wherein a Multimedia Broadcast Multicast Services (MBMS) control channel (MCCH) is selected if the point-to-multipoint service is to be received in the plurality of cells is selected;

receiving, by the UE, scheduling information for the point-to-multipoint service through the selected point-to-multipoint control channel, wherein the scheduling information, provided by an eNode B, is received via the L1/L2 control channel if the point-to-multipoint service is to be received in the single cell, and wherein the scheduling information, provided by an access gateway (AG), is received via the MCCH if the point-to-multipoint service is to be received in the plurality of cells; and receiving, by the UE, the point-to-multipoint service according to the scheduling information, wherein the point-to-multipoint service is an MBMS service, wherein the MBMS service, provided by the eNode B, is received via an MBMS traffic channel (MTCH) from the single cell if the MBMS service is to be received in the single cell, and wherein the MBMS service, provided by the AG, is received via the MTCH from the plurality of cells if the MBMS is to be received in the plurality of cells.

2. The method of claim 1, further comprising utilizing a retransmission scheme based on uplink feedback.

3. A method for transmitting a point-to-multipoint service in a wireless communication system, the method comprising:

providing a plurality of point-to-multipoint control channels to a cell;

transmitting scheduling information for the point-to-multipoint service to a mobile terminal through a selected point-to-multipoint control channel of the plurality of point-to-multipoint control channels, wherein the selected point-to-multipoint control channel is selected according to a selection of the mobile terminal between the point-to-multipoint service is to be transmitted to a single cell and the point-to-multipoint service is to be transmitted to a plurality of cells, wherein the selected point-to-multipoint control channel is an L1/L2 control channel if the point-to-multipoint service is to be transmitted to the single cell, wherein the selected point-to-multipoint control channel is a Multimedia Broadcast Multicast Services (MBMS) control channel (MCCH) if the point-to-multipoint service is to be transmitted to the plurality of cells, wherein the scheduling information, provided by an eNode B, is transmitted to the mobile terminal via the L1/L2 control channel if the point-to-multipoint service is to be transmitted to the single cell, and wherein the scheduling information, provided by an access gateway (AG), is transmitted to the mobile terminal via the MCCH if the point-to-multipoint service is to be transmitted to the plurality of cells; and transmitting the point-to-multipoint service according to the scheduling information, wherein the point-to-multipoint service is an MBMS service, wherein the MBMS service, provided by the eNode B, is transmitted to the mobile terminal via an MBMS traffic channel (MTCH) if the MBMS service is to be transmitted to the single cell, and wherein the MBMS service, provided by the AG, is transmitted to the mobile terminal via the MTCH if the MBMS is to be transmitted to the plurality of cells.

4. The method of claim 3, further comprising utilizing a retransmission scheme based on uplink feedback.

* * * * *